United States Patent [19]

Ohne

[11] Patent Number: 5,682,805
[45] Date of Patent: Nov. 4, 1997

[54] ULTRASONIC MOTOR HAVING A VIBRATORY BODY AND METHOD OF PRODUCING THE SAME

[75] Inventor: Kazuyasu Ohne, Mito, Japan

[73] Assignee: Nikon Corporation, Tokyo, Japan

[21] Appl. No.: 692,399

[22] Filed: Aug. 5, 1996

Related U.S. Application Data

[60] Continuation of Ser. No. 410,291, Mar. 24, 1995, abandoned, which is a division of Ser. No. 229,709, Apr. 19, 1994, Pat. No. 5,432,394.

[30] Foreign Application Priority Data

| Jun. 25, 1993 | [JP] | Japan | 5-180930 |
| Jun. 25, 1993 | [JP] | Japan | 5-180931 |

[51] Int. Cl.$^6$ .................................................. B26D 3/06
[52] U.S. Cl. ........................... 83/875; 83/876; 83/35; 409/131; 409/198
[58] Field of Search .................... 83/876, 875, 35; 409/131, 132, 198, 221, 55; 451/47

[56] References Cited

U.S. PATENT DOCUMENTS

| 385,201 | 6/1888 | Remus | 83/875 |
| 1,036,322 | 8/1912 | Penney | 409/55 |
| 3,499,367 | 3/1970 | Glocker | 409/55 |
| 4,709,610 | 12/1987 | Pool | 83/876 |
| 4,741,236 | 5/1988 | Averill | 83/876 |
| 5,041,750 | 8/1991 | Kitani | 310/323 |
| 5,079,470 | 1/1992 | Kasuga et al. | 310/323 |
| 5,099,167 | 3/1992 | Kimura et al. | 310/323 |
| 5,134,333 | 7/1992 | Atsuta | 310/323 |
| 5,134,348 | 7/1992 | Izukawa et al. | 310/323 |
| 5,191,688 | 3/1993 | Takizawa et al. | 29/25.35 |
| 5,300,850 | 4/1994 | Okumura et al. | 310/323 |
| 5,327,040 | 7/1994 | Sumihara et al. | 310/323 |

FOREIGN PATENT DOCUMENTS

| 2-214477 | 8/1990 | Japan . |
| 2-219475 | 9/1990 | Japan . |
| 2-280676 | 11/1990 | Japan . |
| 2-280677 | 11/1990 | Japan . |
| 3-145974 | 6/1991 | Japan . |
| 3-226279 | 10/1991 | Japan . |

*Primary Examiner*—Maurina T. Rachuba

[57] ABSTRACT

An ultrasonic motor with a vibratory body which has plural groove groups formed in a surface of the vibratory body. Each groove group has at least two grooves which are formed parallel to one another. If the vibratory body has an annular shape, a groove forming member having as many cutting members as grooves in each groove group moves in a radial direction of the vibratory body while the cutting members rotate, simultaneously cutting each groove of a groove group in the surface of the vibratory body. When advancing vibratory waves are generated in a circumferential direction of the vibratory body, the state of vibration of the grooves in a groove group differs, and the resonance of the grooves is suppressed. If the vibratory body has a linear shape, the cutting members rotate as the groove forming member moves perpendicular to the vibratory body, simultaneously cutting each groove of a particular groove group.

20 Claims, 9 Drawing Sheets

ULTRASONIC MOTOR HAVING A VIBRATORY BODY AND METHOD OF PRODUCING THE SAME

This application is a continuation of application Ser. No. 08/410,291, filed Mar. 24, 1995, now abandoned, which is a division of application Ser. No. 08/229,709, filed Apr. 19, 1994, now patented as U.S. Pat. No. 5,432,394.

BACKGROUND OF THE INVENTION

1. Field of the Invention

The present invention relates to an ultrasonic motor having a vibratory body and, more particularly, to an ultrasonic motor having a vibratory body in which the configuration of grooves formed in the vibratory body and a method of forming the grooves in the vibratory body have been improved.

2. Description of the Related Art

Ultrasonic motors have been disclosed, for example, in JP-B-1-40597 (Japanese Examined Patent Publication 1-40597). This kind of ultrasonic motor has a pressure welded vibratory body and a moving body. A piezoelectric body, for instance, which generates vibrations, is mounted in the vibratory body, and by being excited, gives rise to traveling vibratory waves. The moving body is frictionally driven by means of these vibratory waves.

This kind of ultrasonic motor results in achieving high torque even when operating at low speed, and is put to practical use in various mechanisms of cameras, etc.

FIG. 9 is a plan view showing one example of the vibratory body of a prior art ultrasonic motor. As shown in FIG. 9, the vibratory body 10 has an approximately annular shape, and plural grooves 11 are formed in its surface along the circumferential direction. These grooves 11 are formed in order to increase the amplitude of the vibration of the vibratory body 10. The grooves 11 are directed approximately perpendicular to the direction of advance (circumferential direction) of the vibratory waves, or in other words, are formed so as to be directed in radial directions of the vibratory body 10. Namely, as shown in FIG. 9, the grooves 11 are formed parallel with respect to lines I—I, II—II extending in the radial direction and passing through the axis (central portion) of the vibratory body 10.

The grooves 11 of the vibratory body 10 are formed one at a time by a groove forming member comprising a grindstone, etc., which revolves in order to successively cut into the surface of the vibratory body 10. Approximately 100 grooves are generally formed in the vibratory body 10.

However, in the above ultrasonic motor, when vibrational waves are generated in the vibratory body 10, resonance of the grooves may occur. As a result of this resonance, anomalous sounds are generated during the driving of the ultrasonic motor.

In addition, in the prior art method of preparing the vibratory body of the ultrasonic motor, as described above, an excessive amount of time is required to prepare the grooves of the vibratory body 10 because the grooves 11 are formed one by one, resulting in a high manufacturing cost.

SUMMARY OF THE INVENTION

Accordingly, it is an object of the present invention to reduce the generation of anomalous sounds during driving of the ultrasonic motor by improving the shape of the grooves of the vibratory body of the ultrasonic motor, by suppressing the resonance of the grooves when vibrational waves are generated in the vibratory body.

It is a further object of the present invention to shorten the time required to prepare the grooves by means of improvements in the formation of the grooves of the vibratory body of the ultrasonic motor in order to reduce manufacturing costs.

Additional objects and advantages of the invention will be set forth in part in the description which follows, and in part, will be obvious from the description, or may be learned by practice of the invention.

The foregoing objects of the present invention are achieved by providing an ultrasonic motor having an annular vibratory body with plural grooves disposed side by side in an end and about the circumference of the vibratory body, such that the plural grooves form groove groups, each groove group having a first groove and a second groove formed adjacent to and parallel with one another.

In order to achieve the above objects, the groove groups of the vibratory body of the ultrasonic motor may have groove depths which differ from one another. Also, the depths of the first groove and the second groove may differ from one another. By forming grooves having different depths in the vibratory body, the state of vibration of each groove can differ when vibrational waves are generated, suppressing the resonance of the grooves.

The above objects are further achieved by a method of preparing a vibratory body of an ultrasonic motor wherein an annular body is fixed to a support table, a groove forming member with at least two cutting members of circular shape and spaced side by side at a predetermined spacing, is moved in a radial direction of the annular body, the cutting members rotate and cut into the annular body, to form a vibratory body of an ultrasonic motor from the annular body, by simultaneously forming plural grooves in an end surface of the annular body, and the support table is rotated through a predetermined angle, to set the position of the annular body with respect to the groove forming member.

In order to control the depth of cut that the groove forming member makes with respect to the annular body, the groove forming member and annular body are moved in relation to each other.

While making the cuts to form the grooves, the groove forming member may be moved from the outer ring side to the inner ring side of the annular body. An alternative is to move the groove forming member from the inner ring side to the outer ring side of the annular body. And still another alternative for making the grooves is by moving the groove forming member from the outer ring side of the annular body via the center portion of the annular body to the outer ring side of the opposite side of the annular body.

In order to achieve yet another object of the present invention, a method of preparing a vibratory body of an ultrasonic motor is performed, wherein a linear body is fixed to a support table, a groove forming member with at least two cutting members of circular shape and spaced side by side at a predetermined space, is moved perpendicular to the linear body, and the cutting members rotate and cut into the annular body, to form a vibratory body of an ultrasonic motor from the linear body, by simultaneously forming plural grooves in the surface of the linear body. Subsequently, the support table is moved a predetermined amount, to adjust the position of the linear body relative to the groove forming member, thereby allowing the groove forming member to cut more plural grooves in the surface of the linear body. Each of the plural grooves simultaneously cut into the aforementioned linear body is parallel to one another. In preparing the vibratory body of an ultrasonic motor, at least two parallel grooves are simultaneously formed by the groove forming member. Accordingly, the time for preparing the grooves can be shortened.

Furthermore, when the groove forming member moves from the outer ring side of the annular body via the centered position of the annular body to the outer ring side of the opposite side of the annular body, a plurality of grooves can be formed on the opposite side of the annular body by one continuous movement of the groove forming member. Accordingly, the preparation of the grooves becomes more efficient.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1A:
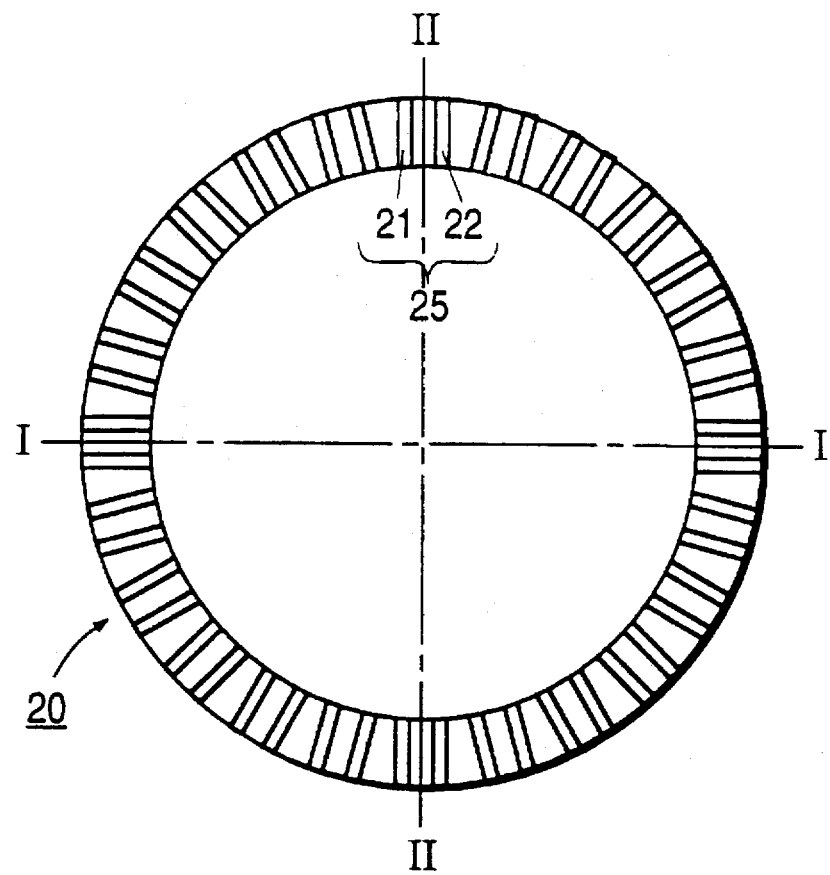
FIGS. 1A and 1B are a plan view and an oblique view, respectively, showing an example of a vibratory body of an ultrasonic motor according to a first embodiment of the present invention.

Reference will now be made in detail to the present preferred embodiments of the present invention, examples of which are illustrated in the accompanying drawings, wherein like reference numerals refer to like elements throughout.

Figure 1B:
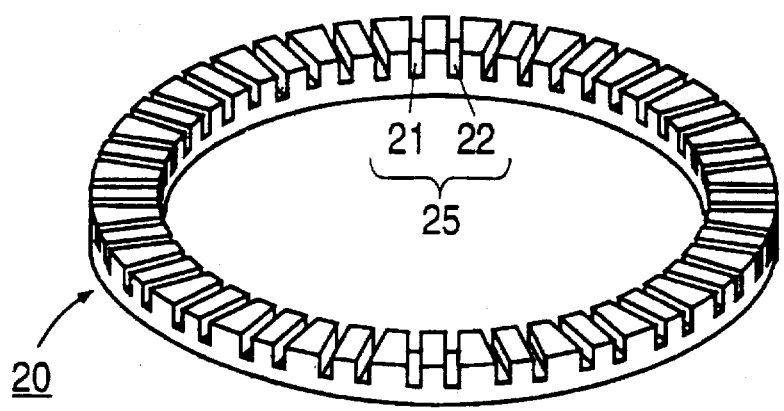

FIGS. 1A and 1B are a plan view and an oblique view, respectively, of an example of a vibratory body of an ultrasonic motor according to a first embodiment of the present invention.

Figure 9:
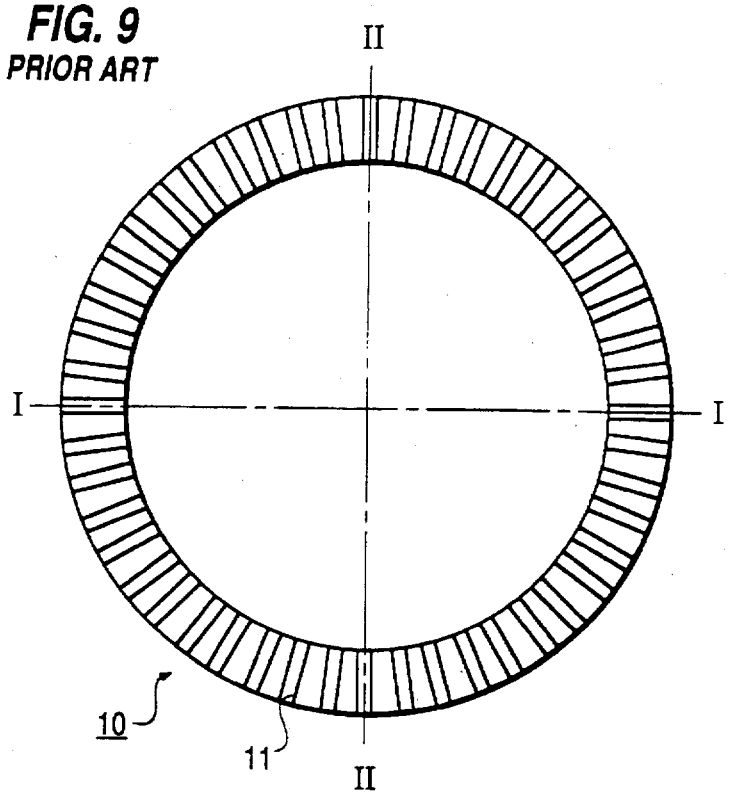
FIG. 9 is a plan view showing an example of a prior art vibratory body.

As shown in FIGS. 1A and 1B, the vibratory body 20, similar to the vibratory body 10 which has been shown for the prior art in FIG. 9, is formed with an approximately annular shape, and plural groups 25 of grooves are formed at spacings along its circumferential surface. These groups 25 of grooves comprise pairs of mutually parallel grooves 21 and 22. These grooves 21 and 22 are formed parallel to lines I—I, II—II extending in radial directions of the vibratory body 20 through the center portion of the groove group 25. Accordingly, the grooves 21 and 22, differing from the grooves 11 of the vibratory body 10 of FIG. 9, are respectively not directed in the radial directions of the vibratory body 20.

Figure 2:
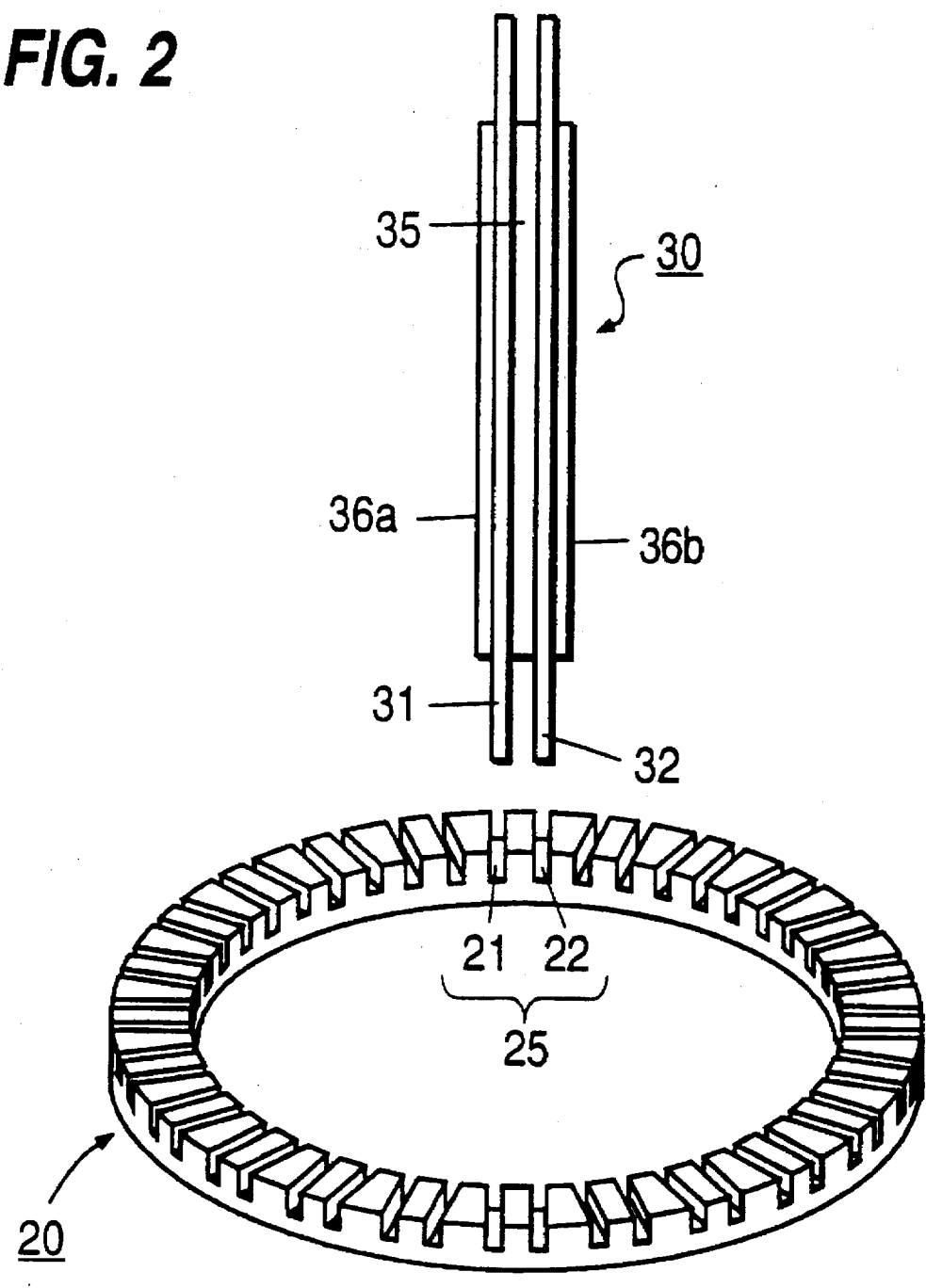
FIG. 2 is an oblique view showing an example of a groove forming member used to form groove groups of the vibratory body of FIG. 1.

FIG. 2 is an oblique view showing an example of a groove forming member used to form the groove groups 25 of the vibratory body 20. As shown in FIG. 2, groove forming member 30 has a pair of cutting members 31 and 32, such as grindstones or the like, formed with an approximately circular shape and able to grind or cut. A spacer 35 is arranged between the cutting members 31 and 32, in order to precisely position them parallel to each other at a suitable spacing. Moreover, holders 36a and 36b are arranged on the outer sides of the cutting members 31 and 32 in order to support them.

Figure 3:
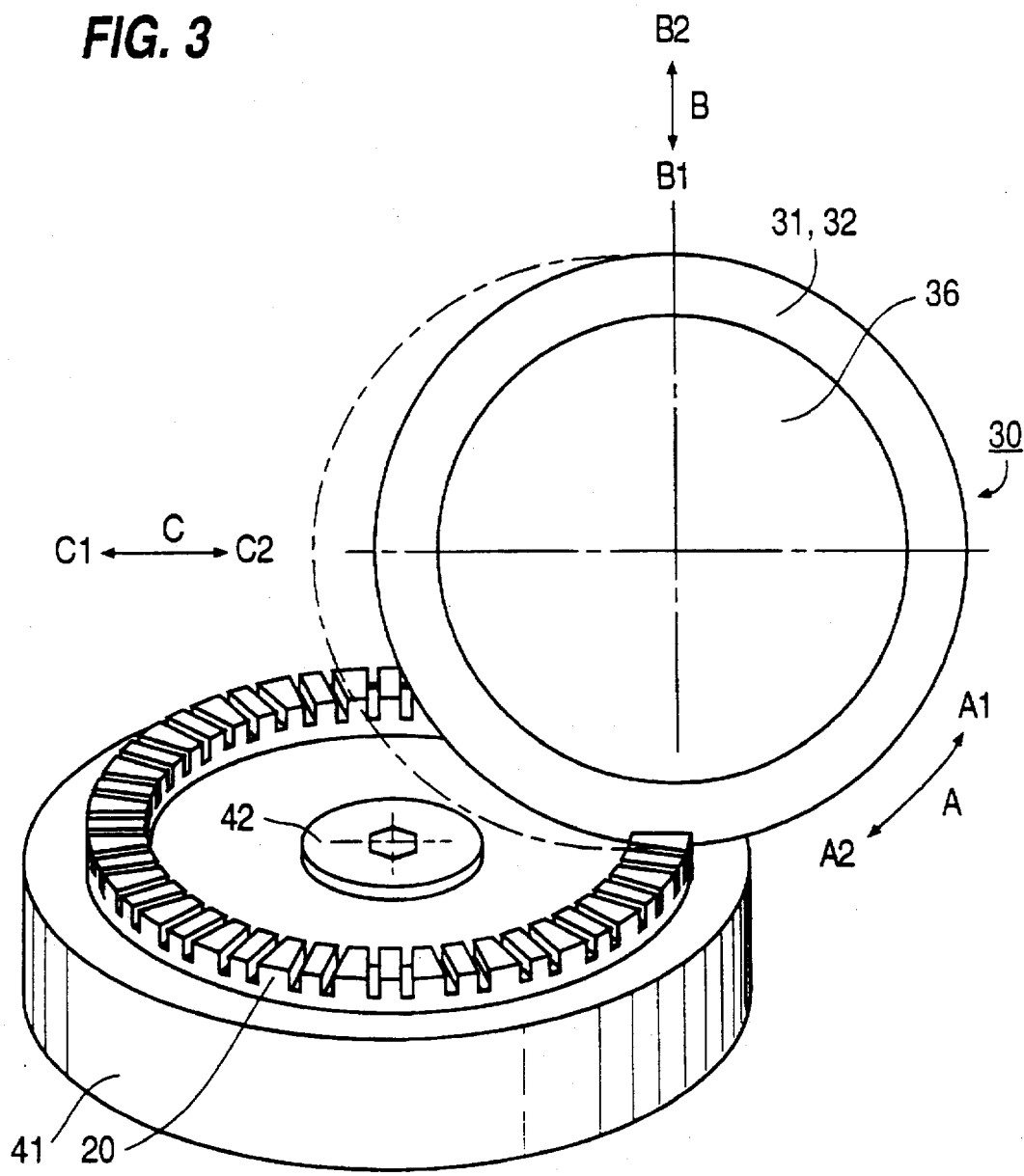
FIG. 3 is an oblique view showing conditions during the formation of a groove group in the vibratory body by means of the groove forming member of FIG. 2.

FIG. 3 is an oblique view showing the conditions when a groove group 25 is being formed in the vibratory body 20 by the groove forming member 30. As shown in FIG. 3, the vibratory body 20 is positioned on a support table 41 and, furthermore, is immovably held by a clamp 42. The support table 41 is rotatably supported.

Moreover, the groove forming member 30 is located so that its rotary shaft is directed perpendicular to the axial direction of the vibratory body 20, and is supported so that cutting members 31 and 32 can rotate (direction A in the Figure), and that respective motions are possible, in the vicinity of the vibratory body 20, such as a separating motion (direction B in the Figure) and a linear motion radial to the vibratory body 20 (direction C in the Figure).

Figure 4:
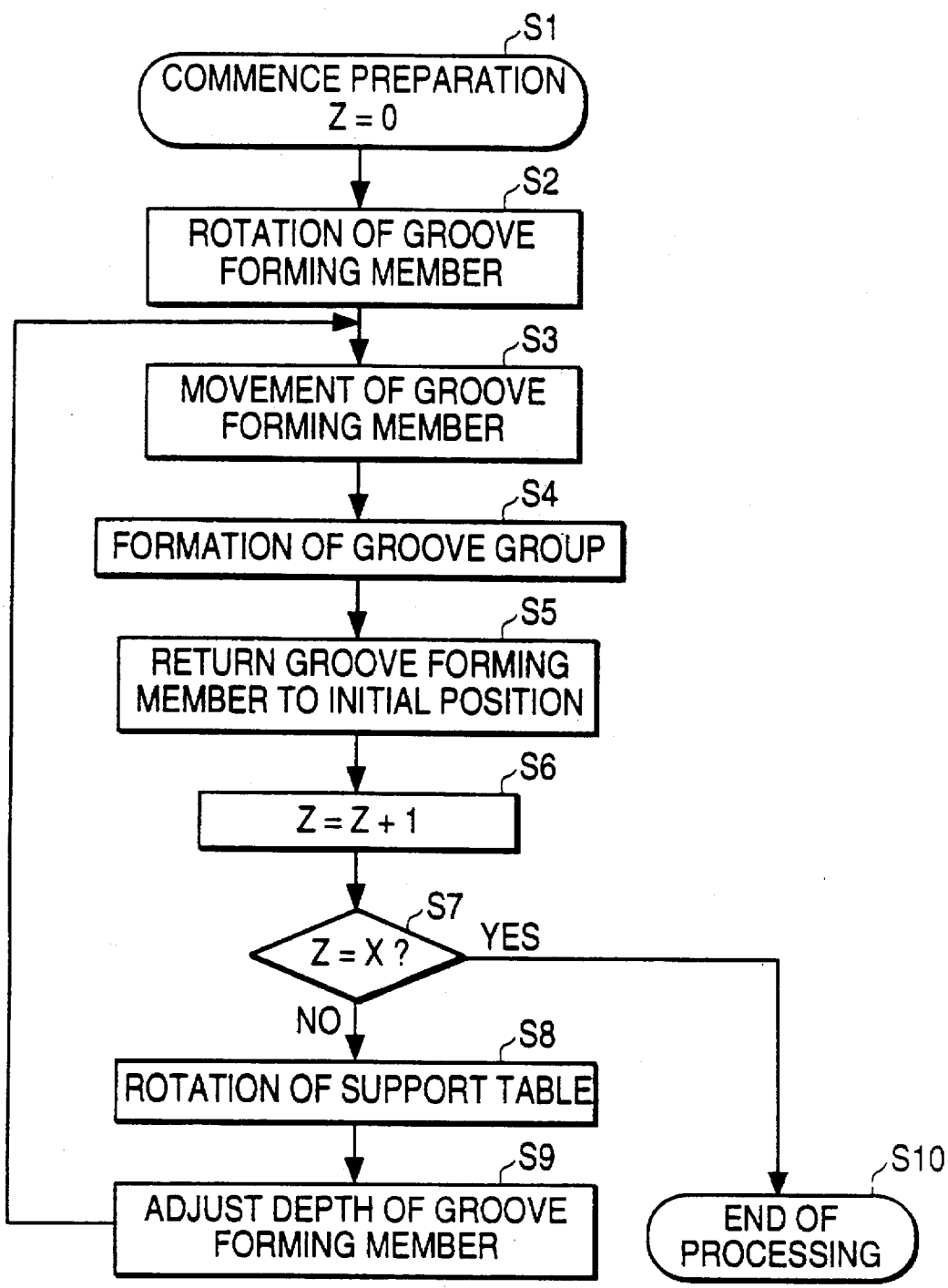
FIG. 4 is a flow chart illustrating the process of preparing the groove groups of the vibratory body in accordance with the first embodiment of the present invention.

FIG. 4 is a flow chart illustrating the process of forming a groove group 25 in the vibratory body 20. An example of the method of preparing the vibratory body 20 will be described below, based on FIGS. 3 and 4.

Firstly, in step S1 of FIG. 4, preparation of a groove group 25 is commenced. At this time, the count number Z, for counting the number of groove groups 25 formed in the vibratory body 20 in FIG. 3, is set to 0 (initialization). Next, proceeding to step S2, the cutting members 31 and 32 of the groove forming member 30 of FIG. 3 are driven by a drive unit (not shown in the drawing) and rotate in the direction A1 in FIG. 3. At this time, the groove forming member 30 is on the right hand side of the vibratory body 20 of FIG. 3, in a state spaced apart from the vibratory body 20.

Next, in step S3 of FIG. 4, the groove forming member 30 is moved at a suitable speed of movement in the radial direction (direction C1 in FIG. 3) of the vibratory body 20. Thus the surface of the vibratory body 20 is cut and a groove group 25 is formed (step S4 in FIG. 4). Grooves 21 and 22 are simultaneously formed.

When the formation of the groove group 25 ends, proceeding to step S5 of FIG. 4, the groove forming member 30 is returned to its initial position. Namely, in FIG. 3, the groove forming member 30 is moved in the direction B2, removing it from cutting the vibratory body 20 and, in addition, is moved in the direction C2 in FIG. 3, and is returned to its initial position as in step S1.

Next, proceeding to step S6 of FIG. 4, the count number Z is incremented by 1, and then proceeds to step S7. In step S7, it is determined whether the count number Z has reached the total number X of groove groups to be formed in the vibratory body 20. When the count number Z has reached the number X of groove groups, it is determined that the formation of groove groups 25 in the vibratory body 20 has ended, and proceeding to step S10, the preparation of additional groove groups 25 ends.

When the count number Z in step S7 has a smaller value than the number X of groove groups 25, the routine next proceeds to step S8. In step S8, the support table 41 is rotated through a predetermined angle, namely by (360/X)°. In this manner, the vibratory body 20 is set in a position with respect to the groove forming member 30 for the formation of the next groove group 25.

Next, proceeding to step S9, the adjustment of the cutting depth of the groove forming member 30 is performed. Because the abrasive grains of the surfaces of the cutting members 31 and 32 of the groove forming member 30 appropriately wear away during the cutting of the grooves, and new cutting edges are successively formed as a consequence of making the groove groups 25, the size of the external diameter gradually decreases. Accordingly, a correction of this amount is performed. Moreover, when the reduction in size of the external diameter of the cutting members 31 and 32 is slight, the process of step S9 may be bypassed. The adjustment of the cutting depth is performed by means of a suitable amount of movement of the groove forming member 30 in the direction B1 in FIG. 3. When this adjustment ends, returning to step S3 from step S9, the formation of a new groove group 25 is performed.

Figure 5:
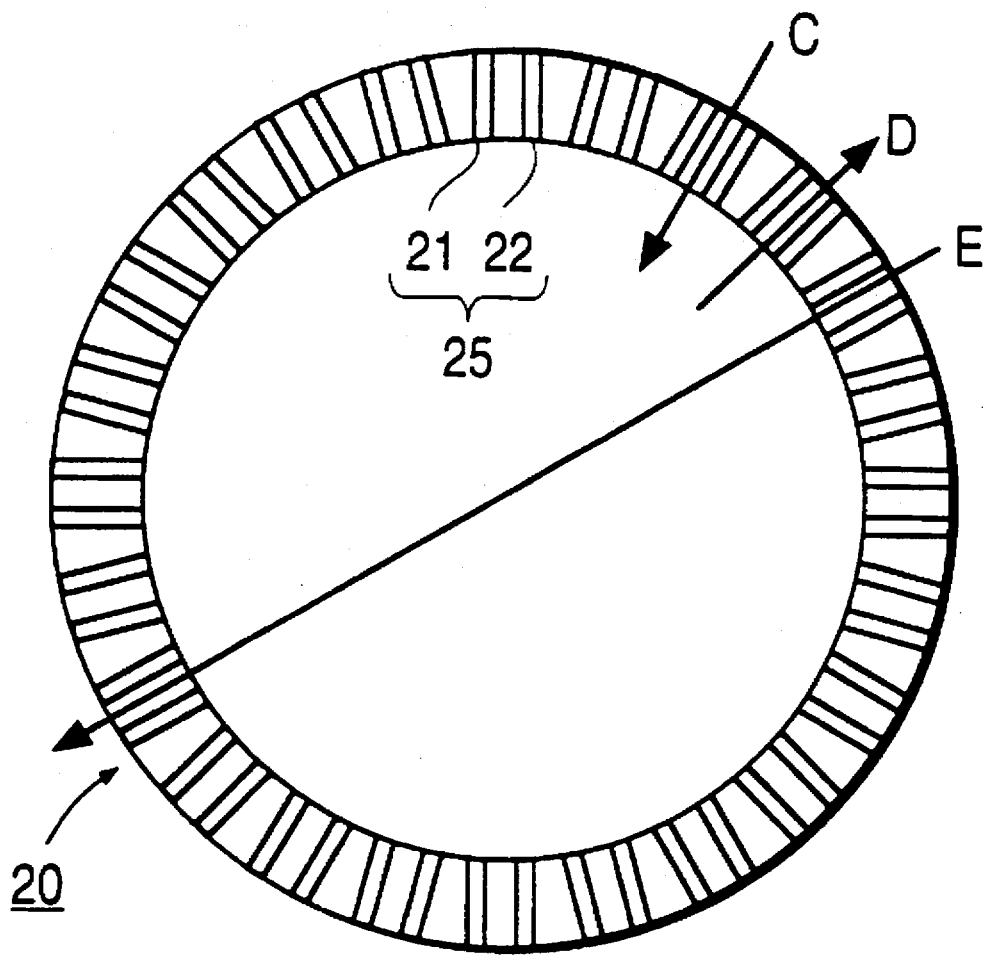
FIG. 5 is a plan view showing the direction of motion of the groove forming member with respect to the vibratory member in accordance with the first embodiment of the present invention.

FIG. 5 is a plan view showing the direction of movement of the groove forming member 30 with respect to the vibratory body 20. In the above mentioned method of preparation, the groove forming member 30 is moved in the direction C shown in FIG. 5 (from the outer ring side to the inner ring side of the vibratory body 20), but the motion is not limited to this; the groove forming member 30 can be moved in the direction D shown in FIG. 5 (from the inner ring side to the outer ring side of the vibratory body 20). Another possibility is to move the groove forming member 30 in the direction E in FIG. 5 (the groove forming member 30 is moved from the outer ring side to the inner ring side of the vibratory body 20, and furthermore across the center portion of the vibratory body 20 to the outer ring side on the opposite side of the vibratory body 20).

When vibratory waves are generated which advance in a circumferential direction of the vibratory body 20 formed in this manner, each groove 21 and 22 vibrates. Here, the grooves 21 and 22 are not exactly radial but, instead, are slightly offset from the radial direction of the vibratory body 20, the orientations of the grooves 21 and 22, respectively, are different with respect to the direction of advance of the vibratory waves and, as a result, the same vibration does not occur in each of the grooves 21 and 22. Because of this, the resonance of each groove 21 and 22 due to the vibratory wave can be controlled.

Figure 6:
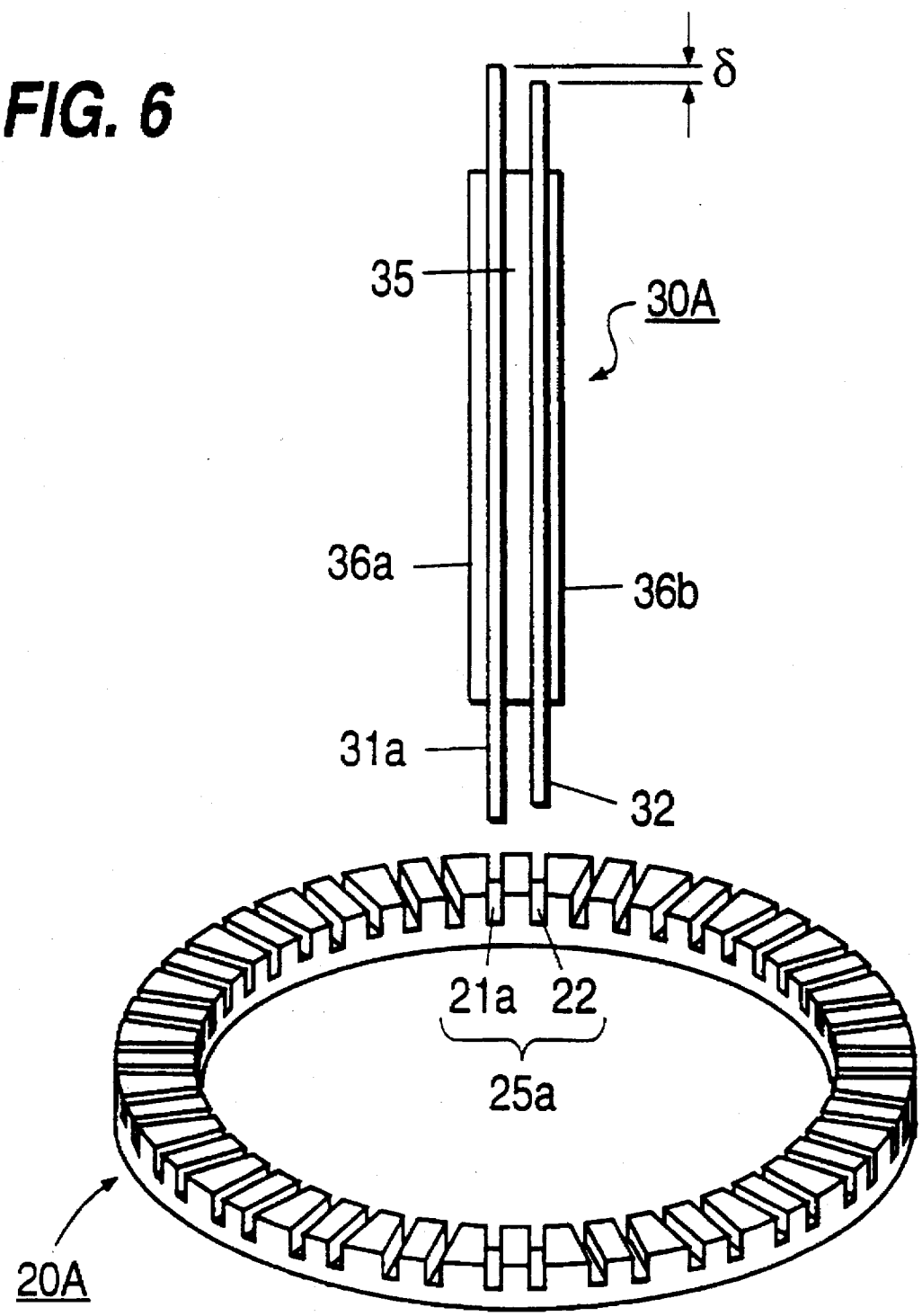
FIG. 6 is an oblique view showing an example of a vibratory body of an ultrasonic motor according to a second embodiment of the present invention, and of a groove forming member forming the vibratory body.

FIG. 6 is an oblique view showing an example of a vibratory body of an ultrasonic motor and of a groove forming member for its formation, according to a second embodiment of the present invention. In other following embodiments described below and shown in the corresponding figures, portions which are the same as in the first embodiment example bear the same reference symbols and duplicate descriptions are appropriately omitted.

In the vibratory body 20A shown in FIG. 6, each groove group 25a comprises a pair of grooves 21a, 22, which are formed parallel to each other, similar to the groove groups 25 of the vibratory body 20 shown in FIG. 1, along an end surface and in a circumferential direction of the vibratory body 20. Here the depth of the grooves 21a is formed deeper by $\delta$ than the depth of the grooves 22.

In order to form the groove group 25a, instead of employing the cutting member 31, a cutting member 31a, which is larger by 2$\delta$ than the cutting member 31 of the first embodiment (FIG. 3), is set up in a groove forming member 30A. Accordingly, the groove 21a is formed by the cutting member 31a, and simultaneously, the groove 22 is formed by means of the cutting member 32.

Figure 7:
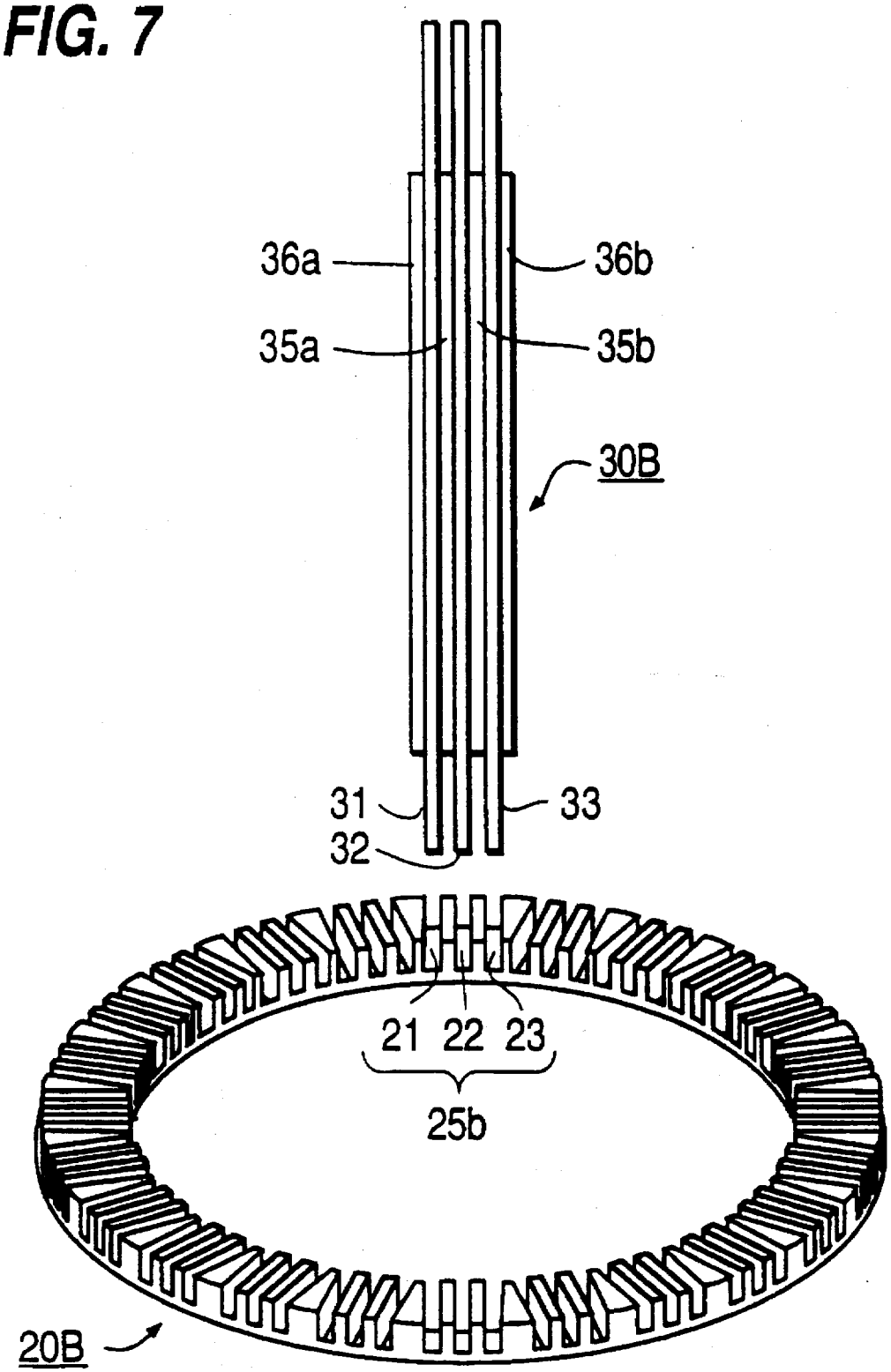
FIG. 7 is an oblique view showing an example of a vibratory body of an ultrasonic motor according to a third embodiment of the present invention, and of a groove forming member for forming the vibratory body.

FIG. 7 is an oblique view showing an example of a vibratory body of an ultrasonic motor and of a groove forming member for its formation, according to a third embodiment of the present invention. In contrast to the groove group 25 of the vibratory body 20 of FIGS. 1A and 1B and the groove group 25a of the vibratory body 20A of FIG. 6, each of which comprise two grooves, the groove group 25b of the vibratory body 20B shown in FIG. 7 comprises three grooves 21–23, formed simultaneously and mutually parallel. The groove 22 is located in the center of the groove group 25b, and is directed in the radial direction of the vibratory body 20B. The other two grooves 21 and 23 are offset slightly from the radial direction of the vibratory body 20.

Moreover, in order to form the groove group 25b, an additional cutting element 33 is set up in the groove forming member 30B, in comparison with the groove forming member 30 of FIG. 2. Furthermore, the cutting members 31 and 32, and the cutting members 32 and 33, are spaced apart at appropriate respective spacings by respective spacings 35a and 35b, and are positioned parallel to each other, in order to cut parallel grooves 21, 22 and 23.

Figure 8:
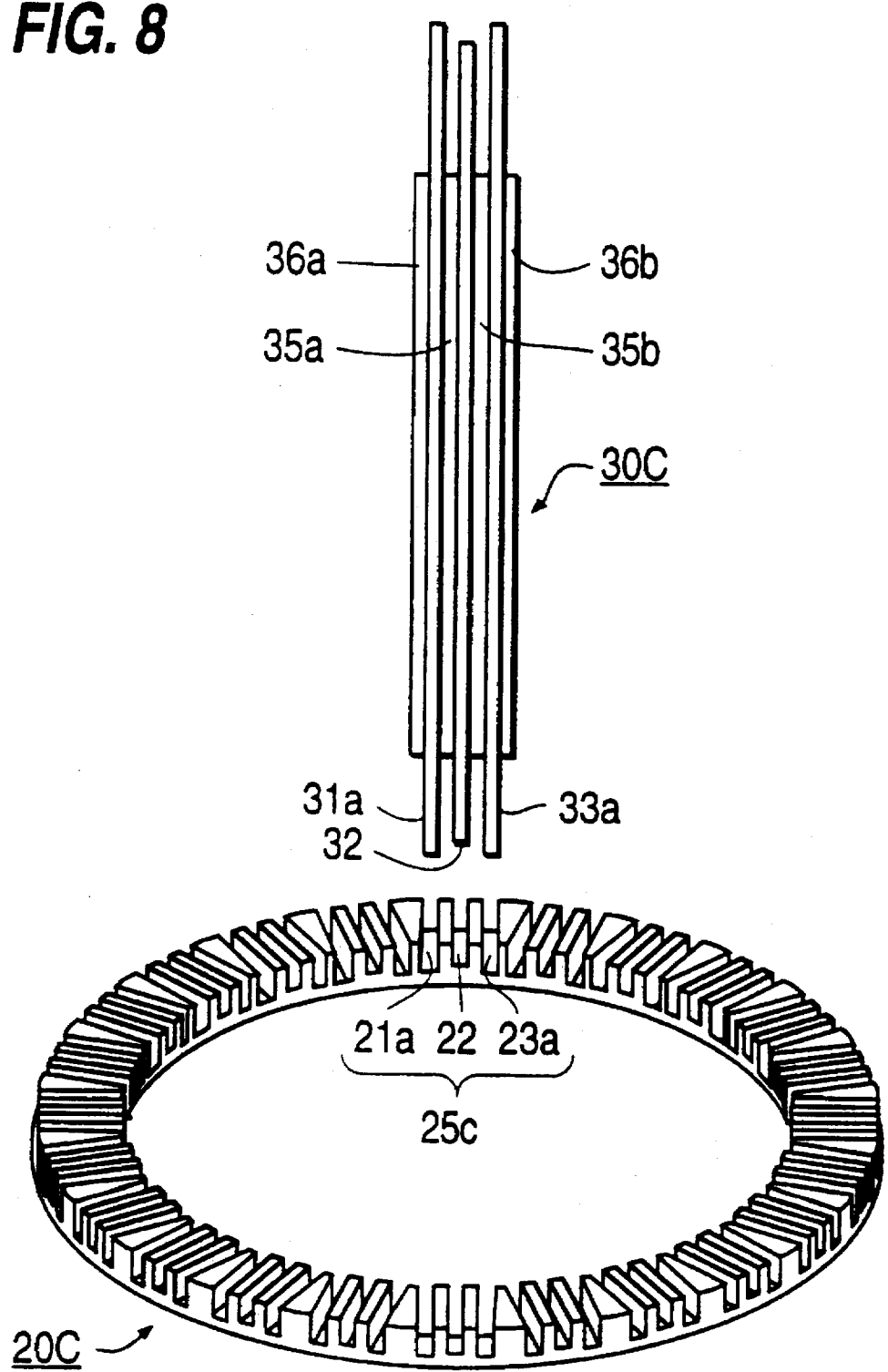
FIG. 8 is an oblique view showing an example of a vibratory body of an ultrasonic motor according to a fourth embodiment of the present invention, and of a groove forming member forming the vibratory body.

FIG. 8 is an oblique view showing an example of a vibratory body of an ultrasonic motor and of a groove forming member for its formation, according to a fourth embodiment of the present invention. The vibratory body 20C shown in FIG. 8, similar to the vibratory body 20B of FIG. 7, has groove groups 25c each comprising three grooves 21a, 22, and 23a, formed mutually parallel to one another. The groove depth of the two side grooves 21a and 23a within groove group 25c is formed deeper than the groove depth of the center groove 22.

The groove forming member 30C is set up with cutting members 31a, 32 and 33a. The cutting members 31a and 33a of the groove forming member 30C have an external diameter which is greater than that of the respective cutting members 31 and 33 of the groove forming member 30B of FIG. 7. Accordingly, the grooves 21a, 22 and 23a are simultaneously formed by the cutting members 31a, 32 and 33a, respectively, to produce each of the groove groups 25c.

In the vibratory bodies 20A–20C of the above second through fourth embodiments, by means of the respective groove forming member 30A–30C, grooves can be formed by a method of processing similar to that of the first embodiment shown in FIGS. 3 and 4.

In the vibratory bodies 20A and 20C, the direction of each groove of the respective groove groups 25a and 25c is parallel to each other, and in addition to this, the depth of the grooves vary. Accordingly, when each groove is vibrated by the vibrational wave, because the amplitudes of vibration of the grooves differ, the resonance of the groups can furthermore be controlled.

Various embodiments of vibratory bodies of ultrasonic motors and of groove forming members for their formation, according to the present invention, have been described above, but the present invention is not limited to the above mentioned embodiments, and various modifications are possible within the scope of the present invention without departing from its essentials. For example, as previously described, the groove groups 25 were formed by a single cut of the groove forming member 30. But depending upon the materials of the cutters 31 and 32 and of the vibratory body 20, the depth of the grooves to be cut into the vibratory body 20 by the groove forming member 30, and the speed of rotation of the cutters 31 and 32 or speed of movement of the groove forming member 30, the groove groups may also be formed by repetitive movement of the groove forming member 30 while gradually making the cutting depth deeper (and similarly in the second through the fourth embodiment examples).

In the above-described embodiments, each groove 21a and 22 (or 21a, 22 and 23a) of the groove groups 25a (or 25c) may be formed with a different groove depth. Furthermore, each groove group 25a (or groove group 25c) may be formed with a different groove depth relative to other groove groups 25a (or groove group 25a).

Figure 10:
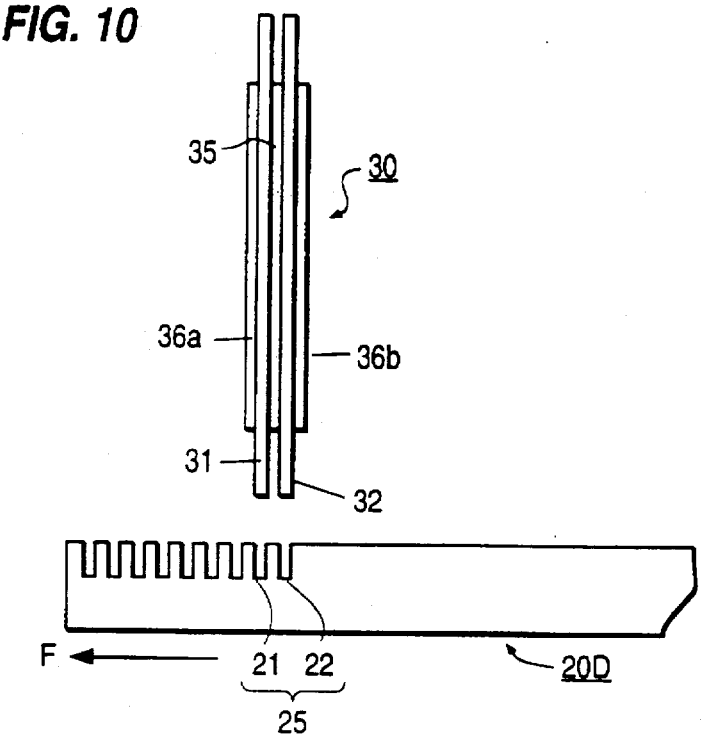
FIG. 10 is an oblique view showing an example of a vibratory body of an ultrasonic motor according to a fifth embodiment of the present invention.

FIG. 10 is a front view showing a vibratory body of an ultrasonic motor and of a groove forming member for its formation, according to a fifth embodiment of the present invention. In the first through fourth embodiments, the vibratory bodies 20 and 20A–20C are approximately annular in shape, but as shown in FIG. 10, a vibratory body 20D has a linear form. Grooves 21 and 22 of groove group 25 can be simultaneously formed in the vibratory body 20D using a groove forming member 30, which can be the same as the one used in the first embodiment, by cutting the vibratory body 20D at a predetermined spacing or an optional spacing. Furthermore, the vibratory body 20D is moved by a predetermined amount in the direction F in FIG. 10, and successive groove groups 25 can be formed.

Moreover, by using the groove forming members 30A, 30B, or 30C, groove groups 25a, 25b, or 25c can be formed in the vibratory body 20D.

As a result of the above-described embodiments of the present invention, grooves, formed in an end of a vibratory body of an ultrasonic motor and within a given groove group, are parallel to one another, and because the state of vibration of each groove differs when vibratory waves are generated in the vibratory body, resonance of the grooves can be suppressed. In addition, by having grooves of different depth, the amplitudes of vibration of each groove differ from one another when the vibratory waves are generated, thereby further suppressing the resonance of each groove. In this manner, the generation of anomalous sounds during the driving of the ultrasonic motor is reduced.

Also as a result of the above-described embodiments of the present invention, the time required to make the grooves in the vibratory body is reduced, which in turn reduces the cost of manufacture of the ultrasonic motor.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of preparing a vibratory body of a vibration motor from an annular body, the method comprising:

moving a groove forming member with first and second groove cutting members in a radial direction of the annular body to form a first groove group having first and second grooves parallel to one another in a top surface of the annular body; and rotating the annular body a predetermined angle to prepare the annular body for formation of a second groove group.

2. The method as claimed in claim 1, further comprising:

controlling a depth of forming a new groove group based upon changes in diameters of the first and second groove cutting members by adjusting the relative positions of the groove forming member and the annular body.

3. The method as claimed in claim 1, wherein said step of moving a groove forming member further comprises:

moving the groove forming member in the radial direction from an outer periphery side to an inner periphery side of the annular body.

4. The method as claimed in claim 2, wherein said step of moving a groove forming member further comprises:

moving the groove forming member in the radial direction from an outer periphery side to an inner periphery side of the annular body.

5. The method as claimed in claim 1, wherein said step of moving a groove forming member further comprises:

moving the groove forming member in the radial direction from an inner periphery side to an outer periphery side of the annular body.

6. The method as claimed in claim 2, wherein said step of moving a groove forming member further comprises:

moving the groove forming member in the radial direction from an inner periphery side to an outer periphery side of the annular body.

7. A method of preparing a vibratory body of a vibration motor from an annular body, the method comprising:

moving a groove forming member with first and second groove cutting members in a straight line in a radial direction of the annular body from a first outer periphery side through a center portion of the annular body to a second outer periphery side opposite the first outer periphery side, to form a first groove group having first and second grooves parallel to one another in a top surface of the annular body; and rotating the annular body a predetermined angle to prepare the annular body for formation of a second groove group.

8. The method as claimed in claim 1, wherein said step of moving a groove forming member further comprises:

moving the groove forming member which also has a third groove cutting cutting member to form the first groove group having first, second and third grooves parallel to one another in the top surface of the annular body.

9. The method as claimed in claim 1, whereto the first and second groove cutting members have different dimensions to form the first and second grooves having different depths.

10. A method of preparing a vibratory body of a vibration motor from an annular body, the method comprising:

rotating first and second circular groove cutting members of a groove forming member, the first and second groove cutting members being parallel to one another; and moving the groove forming member in a radial direction of the annular body to simultaneously form first and second grooves parallel to one another in a top surface of the annular body.

11. The method as claimed in claim 10, further comprising:

rotating the annular body, to prepare the annular body for simultaneously forming third and fourth grooves in the top surface of the annular body.

12. A method of preparing a vibratory body of a vibration motor from an annular body, the method comprising:

moving a groove forming member with first and second groove cutting members in a radial direction of the annular body to form a first groove group having first and second grooves, parallel to one another and having rectangular cross-sections, in a top surface of the annular body; and rotating the annular body a predetermined angle to prepare the annular body for formation of a second groove group.

13. The method as claimed in claim 12, further comprising:

controlling a depth of forming a new groove group based upon changes in diameters of the first and second groove cutting members by adjusting the relative positions of the groove forming member and the annular body.

14. A method of preparing a vibratory body of a vibration motor from an annular body, the method comprising:

moving a groove forming member with first and second groove cutting members in a straight line in a radial direction of the annular body from a first outer periphery side through a center portion of the annular body to a second outer periphery side opposite the first outer periphery side, to form a first groove group having first and second grooves, parallel to one another and having rectangular cross-sections, in a top surface of the annular body; and rotating the annular body a predetermined angle to prepare the annular body for formation of a second groove group.

15. The method as claimed in claim 14, wherein the first and second groove cutting members have different dimensions to form the first and second grooves having different depths.

16. A method of preparing a vibratory body of a vibration motor from an annular body, the method comprising:

moving a groove forming member with first and second groove cutting members in a radial direction of the annular body to form a first groove group having first and second grooves with surfaces parallel to one another in a top surface of the annular body; and rotating the annular body a predetermined angle to prepare the annular body for formation of a second groove group.

17. The method as claimed in claim 16, further comprising:

controlling a depth of forming a new groove group based upon changes in diameters of the first and second groove cutting members by adjusting the relative positions of the groove forming member and the annular body.

18. The method as claimed in claim 16, wherein said step of moving a groove forming member further comprises:

moving the groove forming member in a straight line in the radial direction from a first outer periphery side through a center portion of the annular body to a second outer periphery side opposite the first outer periphery side.

19. The method as claimed in claim 16, wherein the first and second groove cutting members have different dimensions to form the first and second grooves having different depths.

20. A method of preparing a vibratory body of an ultrasonic motor from a linear body, the method comprising:

moving a groove forming member with first and second groove cutting members in a linear direction perpendicular to a feed direction of the linear body to form a first groove group having first and second grooves with sides parallel to one another in a top surface of the linear body, wherein the first and second grooves are formed rectilinearly in the top surface of the linear body; and moving the linear body in the feed direction to prepare the linear body for formation of a second groove group.

* * * * *

UNITED STATES PATENT AND TRADEMARK OFFICE
CERTIFICATE OF CORRECTION

PATENT NO. : 5,682,805
DATED : November 4, 1997
INVENTOR(S) : Kazuyasu OHNE

It is certified that error appears in the above-identified patent and that said Letters Patent is hereby corrected as shown below:

Column 8, Claim 9, line 55, change "whereto" to --wherein--.

Signed and Sealed this

Thirty-first Day of March, 1998

Attest:

BRUCE LEHMAN

Attesting Officer  Commissioner of Patents and Trademarks